US012700745B2

(12) United States Patent
Ber

(10) Patent No.: US 12,700,745 B2
(45) Date of Patent: Aug. 4, 2026

(54) MOBILE PHONE CHARGING CASE AND MOUNT

(71) Applicant: STRIDE CHARGE INC., Calgary (CA)

(72) Inventor: Jeffrey Brian Ber, Calgary (CA)

(73) Assignee: Stride Charge Inc., Calgary (CA)

( * ) Notice: Subject to any disclaimer, the term of this patent is extended or adjusted under 35 U.S.C. 154(b) by 794 days.

(21) Appl. No.: 18/156,689

(22) Filed: Jan. 19, 2023

(65) Prior Publication Data

US 2023/0238810 A1 Jul. 27, 2023

Related U.S. Application Data

(60) Provisional application No. 63/301,725, filed on Jan. 21, 2022.

(51) Int. Cl.
| | |
|---|---|
| *H02J 7/70* | (2026.01) |
| *A45C 11/00* | (2006.01) |
| *H04B 1/3888* | (2015.01) |
| *H04M 1/06* | (2006.01) |

(52) U.S. Cl.
CPC .............. *H02J 7/731* (2026.01); *A45C 11/00* (2013.01); *H04B 1/3888* (2013.01); *H04M 1/06* (2013.01); *A45C 11/002* (2025.01)

(58) Field of Classification Search
CPC ...... H02J 7/0044; A45C 11/00; A45C 11/002; H04B 1/06
USPC ........................................................ 320/107
See application file for complete search history.

(56) References Cited

U.S. PATENT DOCUMENTS

| | | | | |
|---|---|---|---|---|
| 6,765,362 B2 * | 7/2004 | Ta-Shuo | ................ | H02J 7/1407 |
| | | | | 320/104 |
| 8,998,048 B1 | 4/2015 | Wu | | |
| 9,071,060 B2 | 6/2015 | Fathollahi | | |
| 9,461,493 B2 | 10/2016 | Fathollahi | | |
| 9,969,450 B1 | 5/2018 | Lu et al. | | |
| 2014/0061270 A1 | 3/2014 | Richter | | |
| 2014/0061271 A1 | 3/2014 | Tate | | |
| 2015/0148103 A1 * | 5/2015 | Samsilova | ...... | H04M 1/724092 |
| | | | | 439/39 |
| 2016/0134142 A1 * | 5/2016 | Murphy | .................. | H02J 7/731 |
| | | | | 455/573 |
| 2020/0006717 A1 * | 1/2020 | Lei | ........................ | H04B 1/3888 |
| 2021/0041057 A1 | 2/2021 | Jankura et al. | | |

(Continued)

*Primary Examiner* — Suchin Parihar
(74) *Attorney, Agent, or Firm* — Borden Ladner Gervais LLP

(57) ABSTRACT

In an aspect, the present disclosure provide a mountable charging device for a mobile phone. The device includes a case having a recessed interior for use in holding the mobile phone there-within, the recessed interior being dimensioned for conforming contact with an exterior of the mobile phone, the case further comprising: a power supply embedded within the case, and a power port electrically coupled to the power supply, the power port for use in connecting to a mobile phone charging port; a mounting element configured for releasably mounting to an object, and a locking mechanism for releasably attaching the case to the mounting element, the locking mechanism having a first locking element disposed on an exterior surface of the case, and a second locking element disposed on the mounting element configured for releasably locking with the first locking element.

20 Claims, 12 Drawing Sheets

(56) References Cited

U.S. PATENT DOCUMENTS

| 2021/0290794 A1* | 9/2021 | Levandowski | ........... A61L 2/10 |
| 2023/0208164 A1* | 6/2023 | Mazzocchi, Jr. | .... H02K 7/1853 |
| | | | 320/107 |

\* cited by examiner

110

113　　　　　　　　　　　　113

115b

MOBILE PHONE CHARGING CASE AND MOUNT

CROSS-REFERENCE PARAGRAPH

This application claims the benefit of U.S. Provisional Application No. 63/301,725, filed Jan. 21, 2022, entitled "MOBILE PHONE CHARGING CASE AND MOUNT", which are herein incorporated by reference.

FIELD

The present disclosure relates generally to portably charging mobile phones and more particularly to chargeable phone cases and mounts for mobile phones.

BACKGROUND

Ubiquitous use of mobile phones creates ever increasing power supply challenges while on the go. For example, remote and portable charging capabilities for mobile phones may be insufficient to continuously supply power to mobile phones during activities that may not provide readily available access to an external power supply.

It remains desirable however to develop further improvements and advancements in relation to mobile phone cases and mounts, to overcome shortcomings of known techniques, and to provide additional advantages thereto.

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

BRIEF DESCRIPTION OF THE DRAWINGS

Embodiments of the present disclosure will now be described, by way of example only, with reference to the attached Figures.

Figure 1:
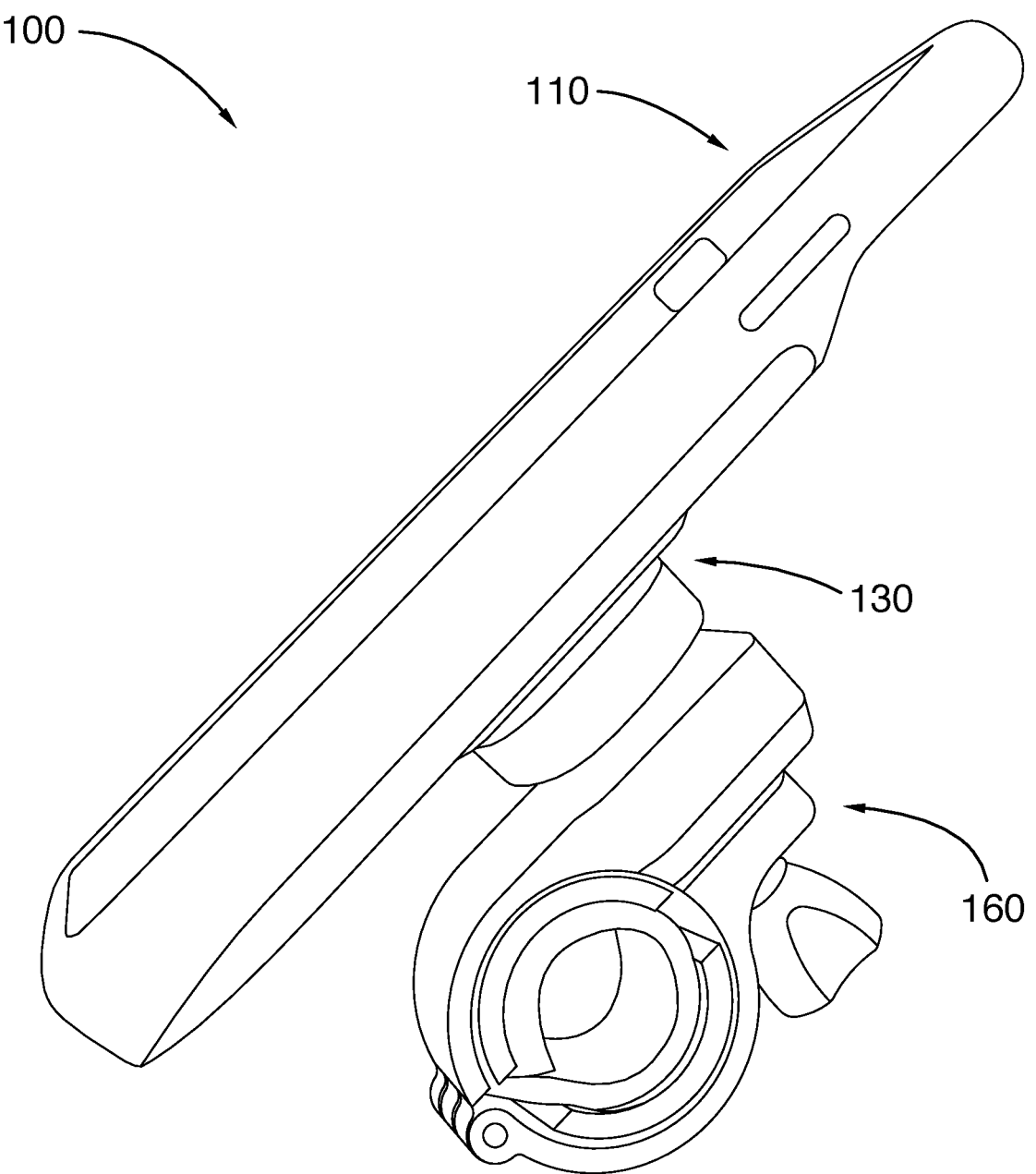
FIG. 1 is a perspective view a charging case secured to a mount in accordance with an embodiment of the present disclosure.

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompasses by the corresponding description.

DETAILED DESCRIPTION

The following are examples of a mobile device charging case and mount in accordance with the present disclosure.

In an aspect, the present disclosure provides a charging device for a mobile phone, comprising: a case having a recessed interior for use in holding the mobile phone therewithin, the recessed interior being dimensioned for conforming contact with an exterior of the mobile phone, the case further comprising: a power supply embedded within the case, and a power port electrically coupled to the power supply, the power port for use in connecting to a mobile phone charging port; a mounting element configured for releasably mounting to an object, and a locking mechanism for releasably attaching the case to the mounting element, the locking mechanism having a first locking element disposed on an exterior surface of the case, and a second locking element disposed on the mounting element configured for releasably locking with the first locking element.

In an embodiment, the first locking element is integrally formed with the exterior surface of the case.

In an embodiment, the first locking element and the second locking element collectively comprise complimentary mating elements configured to: lock the first and second locking elements together when intermeshed in a locked position, and unlock the first and second locking elements from one-another when unmeshed in an unlocked position.

In an embodiment, the mating elements are rotatably meshable, and a relative rotation of the first and second locking elements transitions the locked and unlocked positions.

In an embodiment, the mating elements comprise: a plurality of protrusions, and a plurality of complimentary locking enclosures, each locking enclosure having an opening on an exterior surface for receiving a protrusion and an inner recess formed adjacent the opening, the inner recess dimensioned for intermeshing with the protrusion.

In an embodiment, engaging the locked position comprises inserting the plurality of protrusions through the plurality of openings of the locking enclosures, and rotating the plurality of protrusions into the plurality of locking enclosures, for intermeshing with the recess thereof.

In an embodiment, a width of the protrusion substantially corresponds to a width of the recess.

In an embodiment, the first locking element comprises the plurality of locking enclosures, and the second locking element comprises the plurality of protrusions.

In an embodiment, the plurality of locking enclosures comprise four locking enclosures and the plurality of protrusions comprise four complimentary protrusions.

In an embodiment, the mounting element comprises a clasp for releasably mounting to an annular object.

In an embodiment, the clasp comprises: a first end, a second end releasably connectable to the first end and defining an annular cavity when connected therewith for mounting to the annular object, and a hinge connected between the first end and the second end, the first and second ends being pivotable about the hinge.

In an embodiment, the first end comprises a first semi-annular element, and the second end comprises a second semi-annular element; wherein the first semi-annular element and the second semi-annular element define the annular cavity when the first end is connected with the second end.

In an embodiment, the charging device further comprises a resiliently compressible material disposed between the first and second end of the clasp, for conforming a fit of the clasp to an exterior of the annular object when connected thereto.

In an embodiment, the charging device is for mounting to a handle bar.

In an embodiment, wherein the mounting element comprises an adjustable strap for wrapping around and attaching to an object.

In an embodiment, the power supply comprises a rechargeable power source.

In an embodiment, the charging device further comprises a solar cell electrically coupled to the power supply.

In an embodiment, the charging device further comprises a switch for toggling electrical connectivity between the power supply and the power port.

In an embodiment, the power port comprises an input port and an output port, wherein the output port is for use in connecting the mobile phone charging part, and, the input port is for use in connecting to an external power source, for use in re-charging the power supply.

In an aspect, the present disclosure provides, a kit for assembling a charging device and bicycle mount for a mobile phone in accordance with an embodiment of the present disclosure.

In an aspect, the present disclosure provides, a kit for assembling a charging device and bicycle mount for a mobile phone, comprising: a case having a recessed interior for use in holding the mobile phone there-within, the recessed interior being dimensioned for contacting conformity with an exterior of the mobile phone, the case further comprising: a power supply embedded within the case, and a power port electrically coupled to the power supply, the power port for use in connecting to a mobile phone charging port; a first locking element attachable to an exterior surface of the case, and a mounting element comprising: a second locking element having complimentary elements for intermeshing with the first locking element and releasably locking therewith, and a releasably attachable clasp having first and second ends movable between an unmounted mode and a mounted mode, the first and second ends defining: an opening for receiving an annular object when separated apart in the unmounted mode, and an annular cavity for encircle the annular object when connected together in the mounted mode.

In an aspect the present disclosure provides a charging case and mount for securely holding and powering a mobile phone, providing a portable power supply for use in charging the mobile phone while the phone is in use and securely mounted to another object, such as being used while mounted to: handlebars on a bike or stroller, a human arm, a shoulder strap of a backpack, a feature or surface of a vehicle such as in a car, golf cart, or boat, and so forth. Advantageously, the charging case and mount provide on the go charging capabilities to the mobile phone during activities which may otherwise lack access to an outlet or other source of power, improving portable usage of the mobile phone by extending a period of uninterrupted use of the mobile phone while also providing mounting functionality for securing the charging case to an object. For example, while biking, the charging case may act as an additional power supply for the mobile phone in combination with the mount securely fixing the charging case to the bike, extending a period of uninterrupted use of the mobile phone during the bicycling activity. Embodiments for a charging case and mount in accordance with the present disclosure may include, but are not limited to, a charging case and mount for a bicycle frame, a stroller, a human appendage, a backpack, a feature or surface in a vehicle, such as mounting to a feature of a dashboard of a car, golf cart, or boat, and so forth. In an aspect, the present disclosure provides a locking mechanism having first and second locking elements, with one locking element separately disposed on the charging case and the other being disposed on the mount; wherein the first and second locking elements are configured for releasably locking with one-another, allowing for securely locking (and selectively releasing) the charging case with the mount. In an embodiment, the first and second locking elements collectively comprise a set of complimentary locking elements configured for selectively intermeshing and maintaining a locked configuration between the first and second locking elements. In an aspect the present disclosure provides, a kit for assembling a charging device and bicycle mount for a mobile phone in accordance with an embodiment of the present disclosure.

Figure 2:
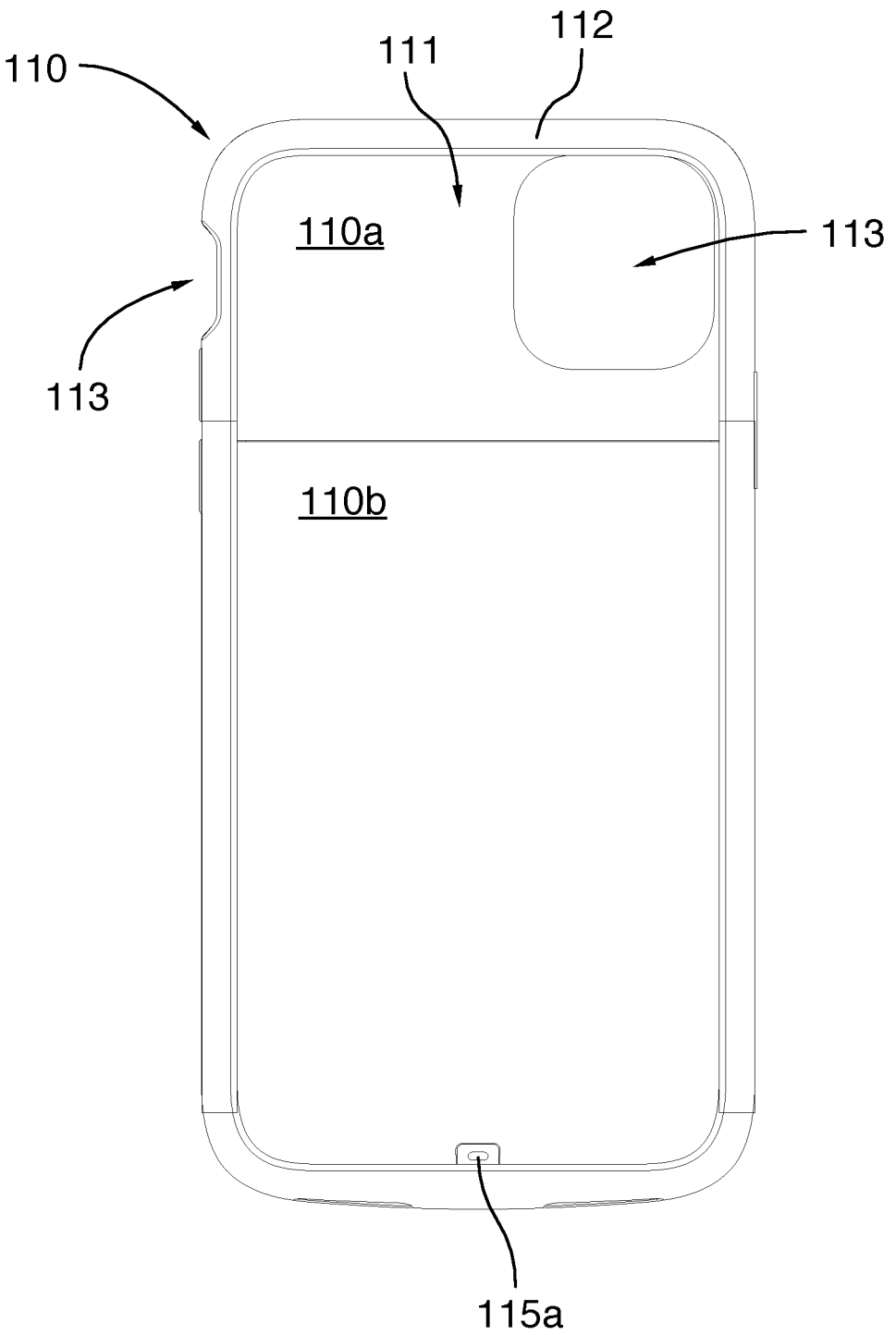
FIG. 2 is a front side elevation view of a charging case in accordance with an embodiment of the present disclosure.
Figure 3:
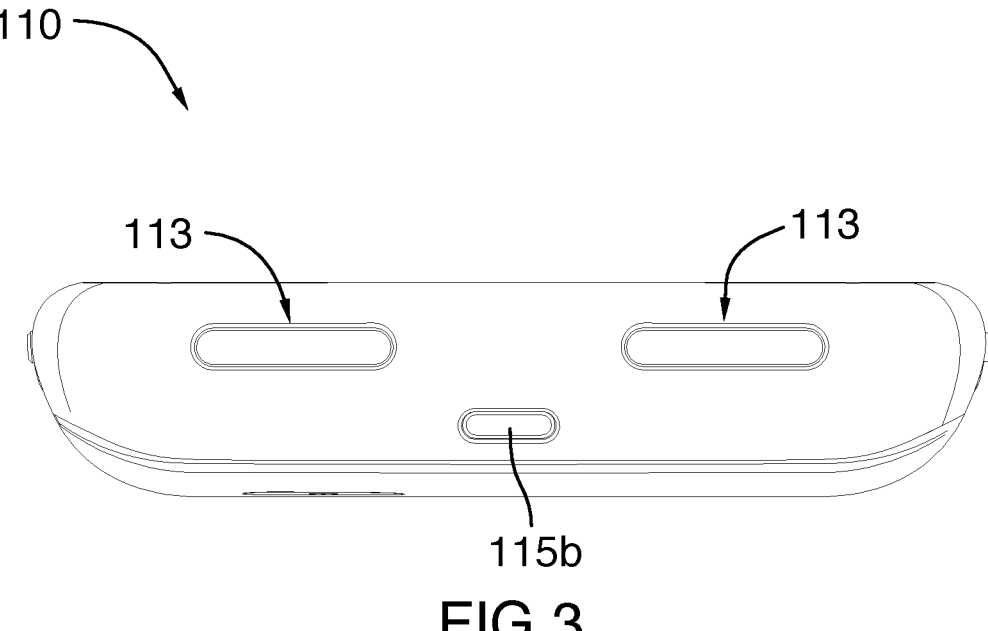
FIG. 3 is a bottom side elevation view of the charging case illustrated in FIG. 2.
Figure 4:
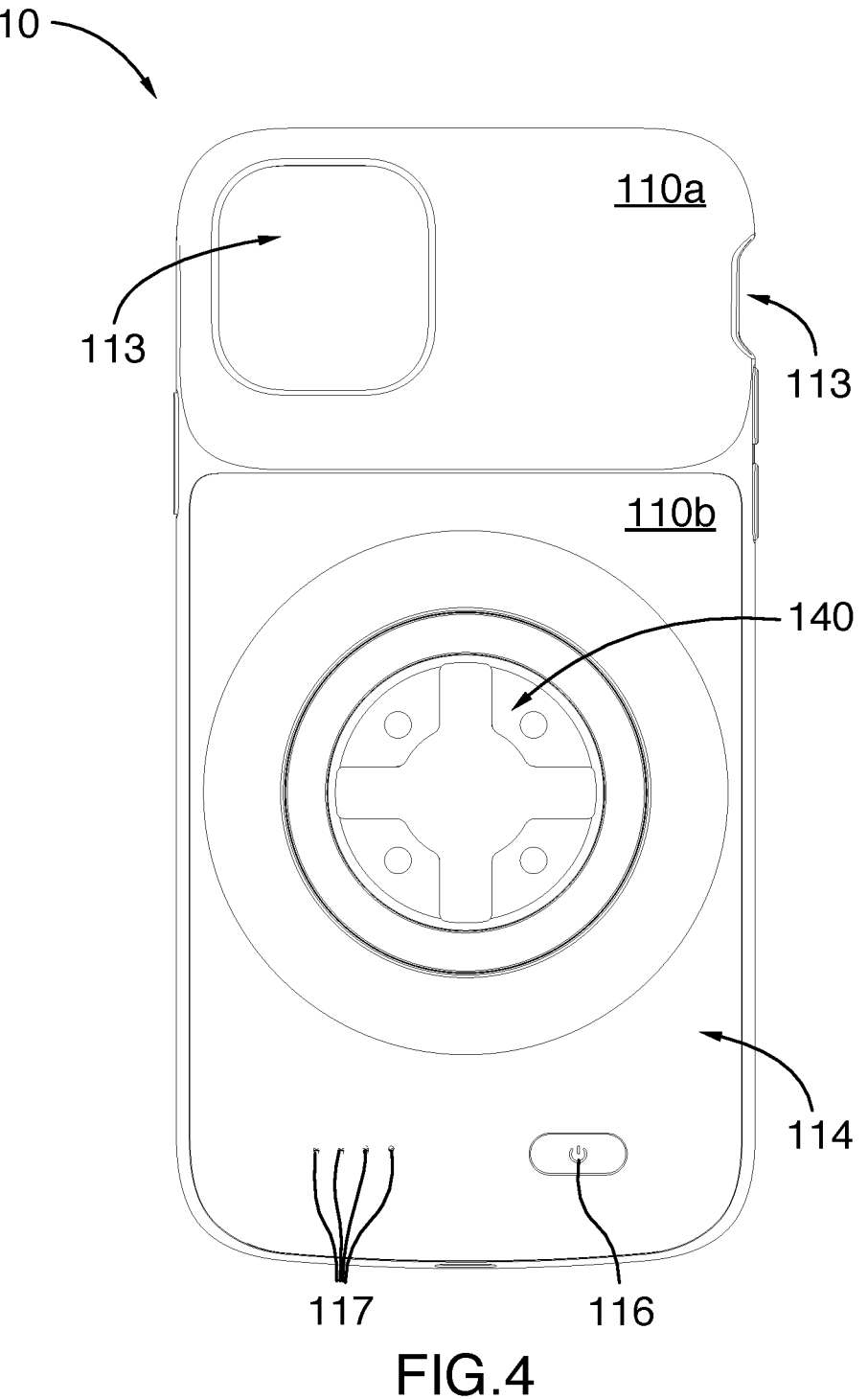
FIG. 4 is a rear side elevation view of the charging case illustrated in FIG. 2.
Figures 5A, 5B, 5C, 5D:
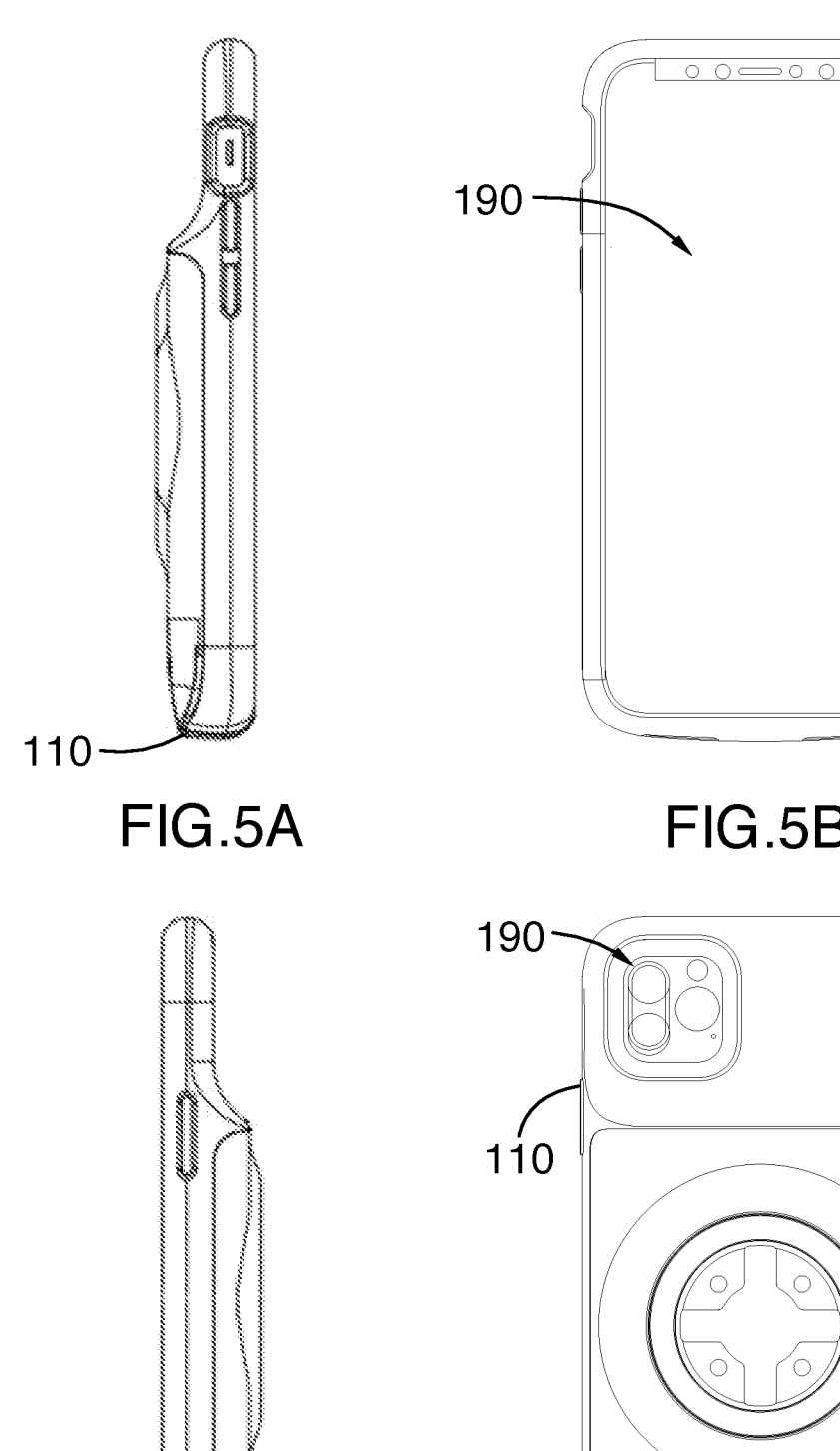
FIGS. 5A, 5B, 5C, and 5D are elevation views of a first side, front side, second side, and rear side, of a charging case in accordance with an embodiment of the present disclosure, having a mobile inserted therein.
Figure 6:
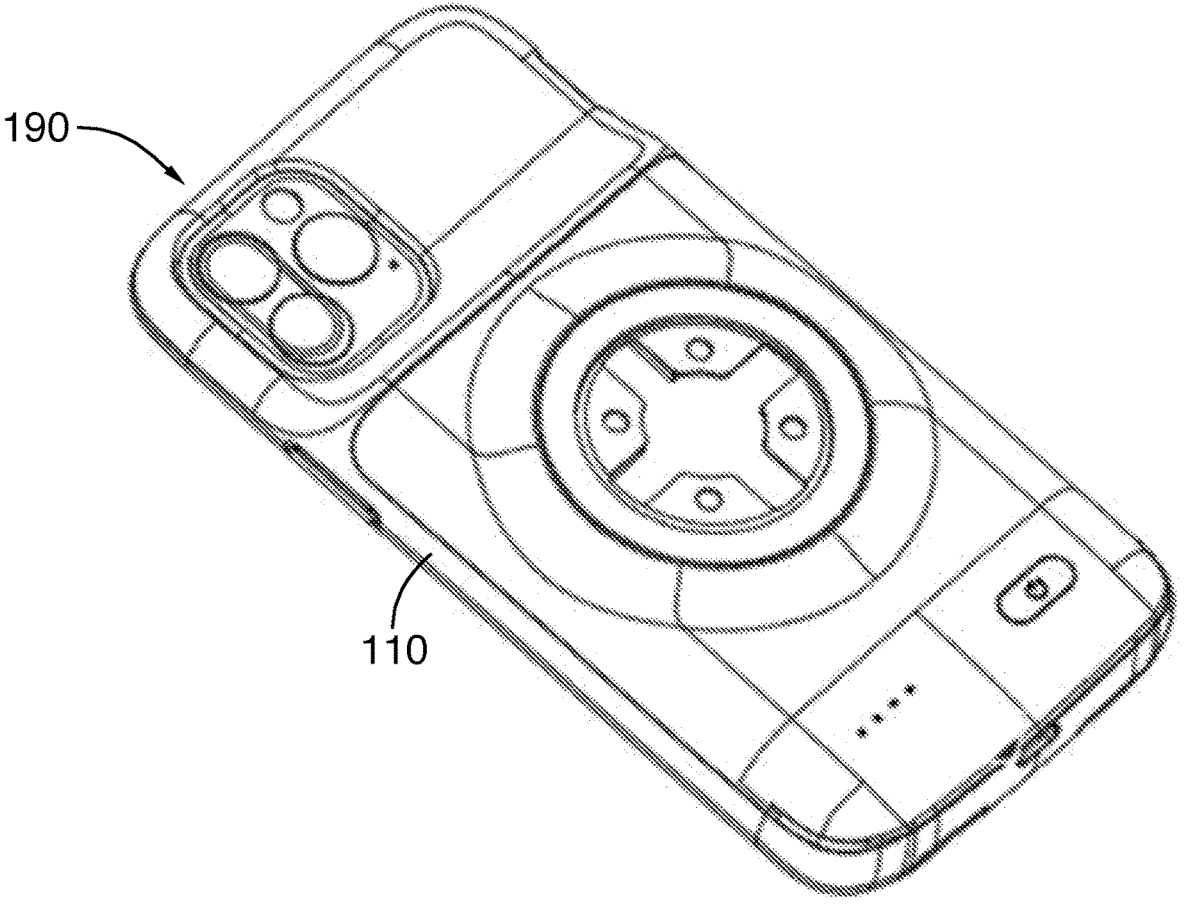
FIG. 6 is a perspective view of the charging case and mobile phone illustrated in FIG. 5.
Figure 7:
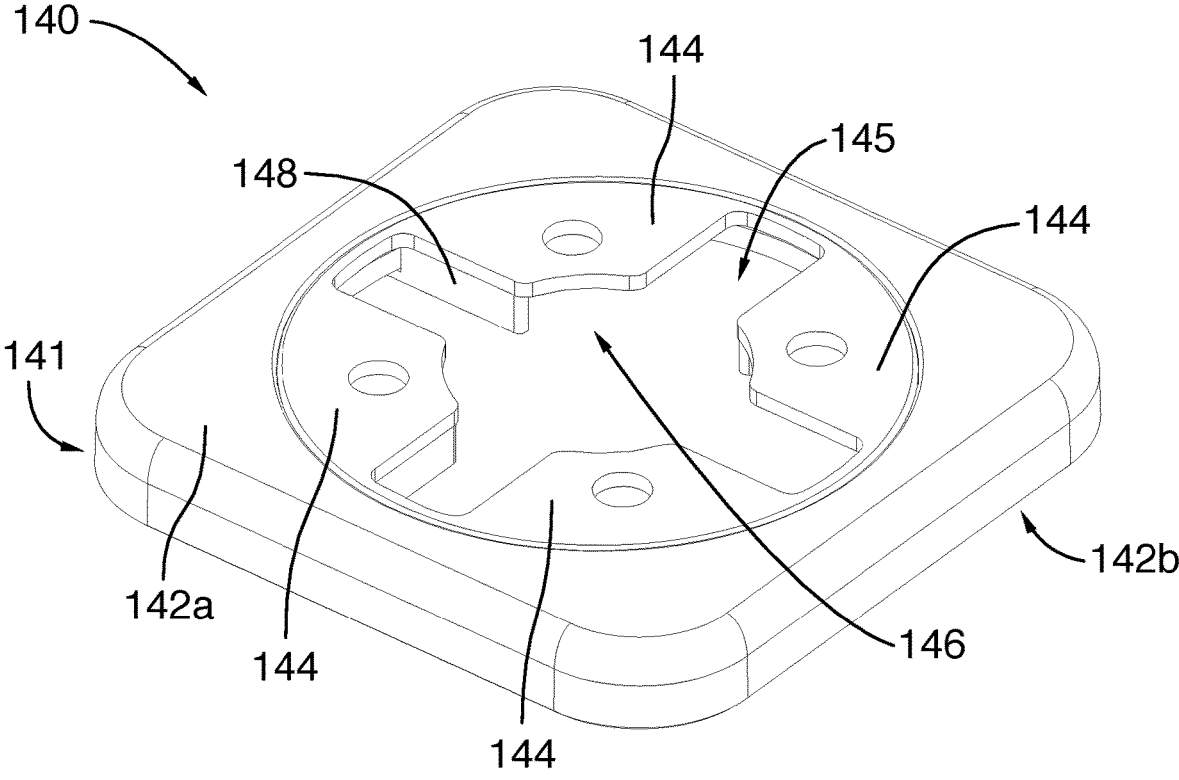
FIG. 7 is a perspective view of a first locking element of a locking mechanism in accordance with an embodiment of the present disclosure.
Figure 8:
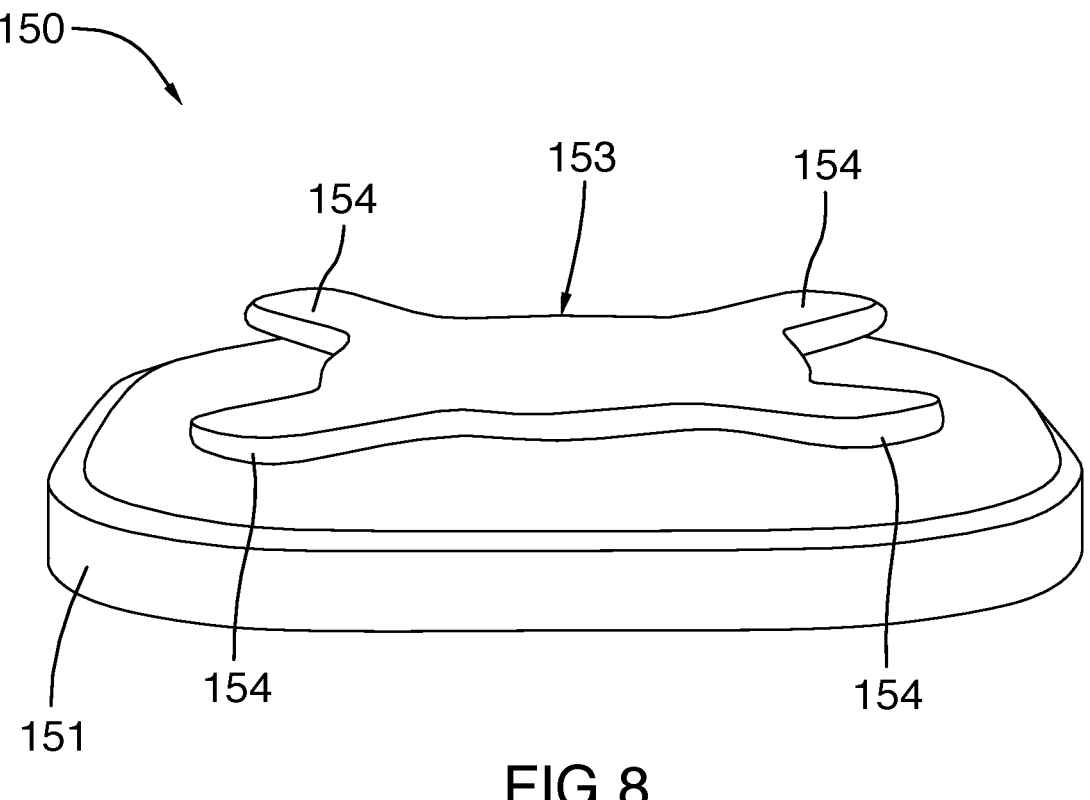
FIG. 8 is a perspective view of a second locking element of a locking mechanism in accordance with an embodiment of the present disclosure.
Figure 9:
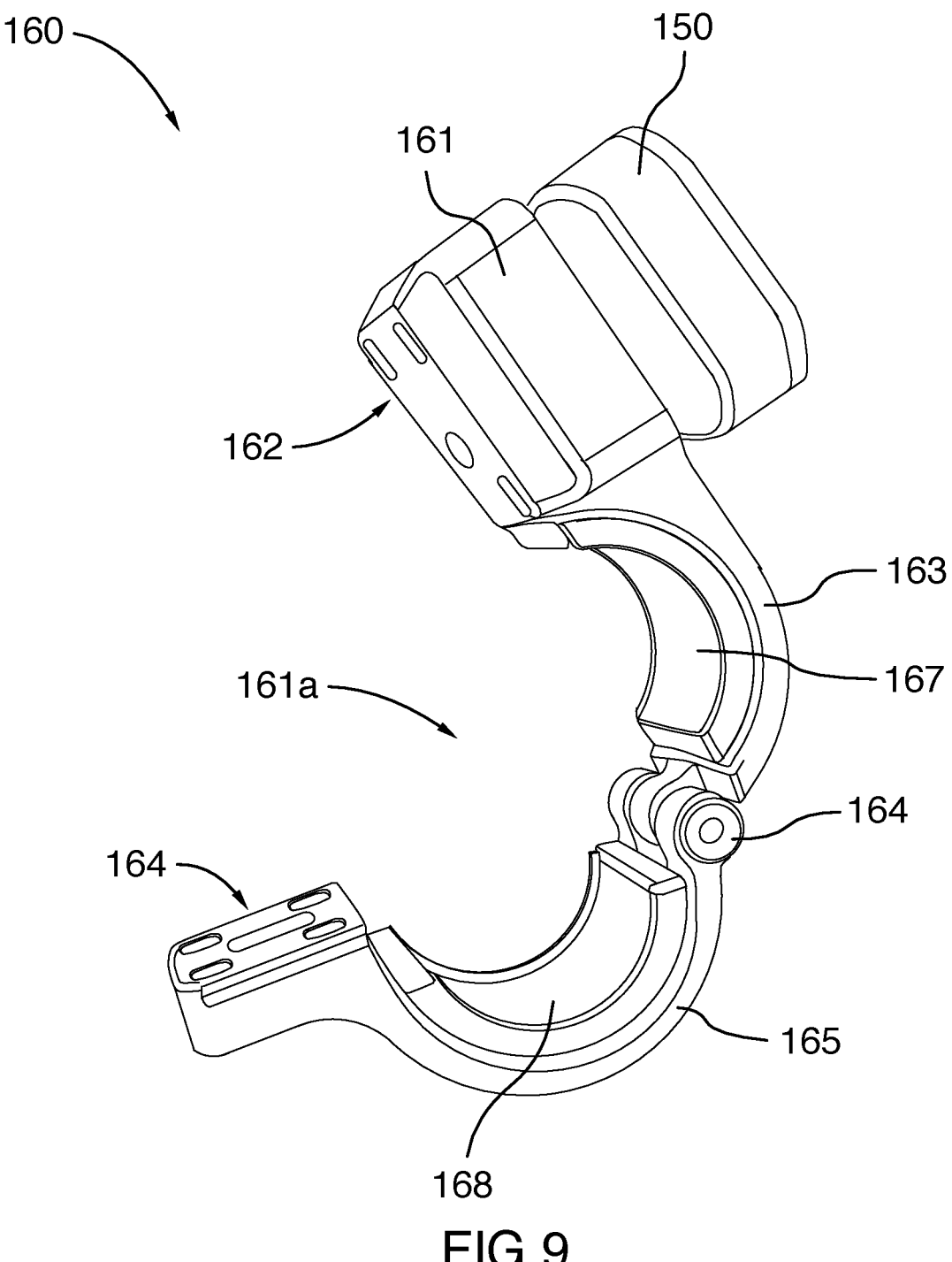
FIG. 9 is perspective view of a mount in accordance with the present disclosure, wherein the mount is depicted in an open configuration.
Figure 10:
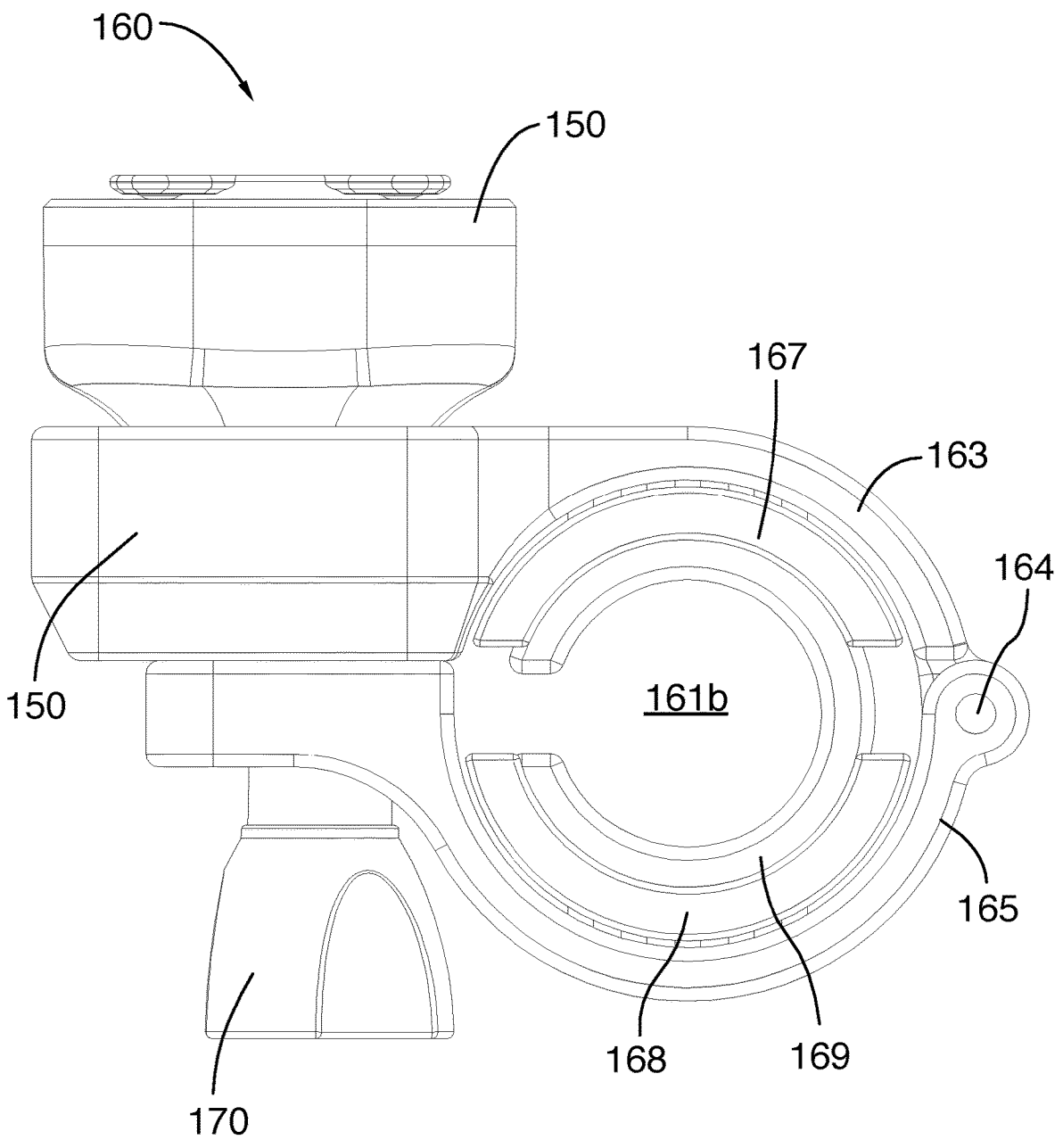
FIG. 10 is a side elevation view of the mount illustrated in FIG. 10, wherein the mount is depicted in a closed/locked configuration.

FIG. 1 illustrates an embodiment of a charging case and mounting device 100 in accordance with the present disclosure. The device 100 includes a charging case 110, locking mechanism 130, and mount 160, as further illustrated in FIG. 2 (front elevation view of the charging case 110); FIG. 3 (bottom elevation view of the charging case 110); FIG. 4 (back elevation view of the charging case 110); FIGS. 5A-5D (side elevation view, front elevation view, side elevation view, and rear elevation view, respectively, of a mobile phone 190 secured in a charging case 110); FIG. 6 (perspective view of the mobile phone 190 secured in a charging case 110); FIG. 7 (perspective view of a first locking element 140 of the locking mechanism 130); FIG. 8 (perspective view of a second locking element 150 of the locking mechanism 130); FIG. 9 (perspective view of a mount 150 in an open configuration); and FIG. 10 (side elevation view of a mount 160 in a mounted configuration).

The charging case 110 includes an interior 111 recessed from a peripheral edge 112 of the mobile phone 110. The recessed interior 111 and the edge 112 are dimensioned for providing conforming contact between the charging case 110 and an exterior of a mobile phone 190, for securely holding the mobile phone 190 within the charging case 110. The charging case 110 may include a first portion 110a comprising a first material and a second portion 110b comprising a second material. For example, the first portion 110a may comprise a first material having a degree of flexibility and limited frictional resistance, providing minor bending in the first portion 110a for readily inserting a portion of the mobile phone 190 into the charging case 110. Furthermore, the second portion 110b may comprise a second material different from the first material. For example, the second material may comprise a non-flexible, hardened material to improve a sturdiness of the case 110. In an embodiment, the first material comprises a thermoplastic polyurethane (TPU) based material and the second material comprises an acrylonitrile butadiene styrene (ABS) based polymer. In an embodiment, the second material comprises iron, silicon, and aluminum. In an embodiment, the peripheral edge 112 of the charging case 110 may comprise a shock-absorbent material to protect the mobile phone 190 from experiencing shock effects that may arise from activities such as bicycling, exercising, and hiking. In an embodiment, the second portion 110b may comprise a layer of lining material comprising a non-abrasive material to reduce abrasion, wear, and scratching between the charging case 110 and the mobile phone 190. In an embodiment, the lining material comprises nylon. In an embodiment, the peripheral edge 112 may comprise a shock-absorbent band. In an embodiment, the shock-absorbent material is a resiliently compressible material. In an embodiment, the shock-absorbent band may comprise silicon or rubber based materials. Advantageously, embodiments of a charging case as disclosed herein provide improvement over cradle case mounts, which do not adequately secure a mobile phone in place during activities such as bicycling, exercising, and hiking.

In an embodiment, the recessed interior 111 and the edge 112 are dimensioned to not cover or contact a display screen of the mobile phone 190 when the mobile phone 190 is secured within the charging case 110. In an embodiment, the edge 112 contacts a perimeter of a display screen of the mobile phone 190 when the mobile phone 190 is secured within the charging case 110. The charging case 110 may include a plurality of complimentary openings 113 for exposing external features of the mobile phone 190, for interfacing therewith, when the mobile phone 190 is secured within the charging case 110. For example, the openings 113 may be sized and shaped to match the dimensions of corresponding features located on an exterior of the mobile phone 190. Embodiments of an opening may be sized and shaped to provide unobstructed access to features on a mobile phone 190, including but not limited to, features such as: volume up, volume down, power on/off, interface outlets for power and sound, speakers, cameras, and other features provided on an exterior of the mobile phone 190.

The charging case 110 includes a rechargeable power supply 114 (not illustrated) embedded within the charging case 110 and being in electrical communication with a power port comprising an output port 115a and an input port 115b Embodiments of a power supply 114 may comprise rechargeable batteries including rechargeable lithium batteries. In an embodiment, the power supply 114 comprises a rechargeable lithium battery having a capacity capable of providing a full charge to a mobile phone. For example, the charging case 110 may be configured for receiving an iPhone 11 Pro Max and the power supply 114 may comprise a rechargeable lithium battery having a capacity capable of fully charging an iPhone 11 Pro Max from 0% to 100%. In an embodiment, the power supply 114 comprises a rechargeable lithium battery having a capacity between 4800 mAh and 5000 mAh. In an embodiment the device 100 includes a solar cell electrically coupled to the power supply 114. In an embodiment, the charging case 110 and rechargeable power supply 114 may be configured for recharging via induction. In an embodiment the charging case 110 may comprise electrical elements and circuitry configured for protecting an electrical function of the charging case 110. In an embodiment, the charging case 110 comprises electrical elements and circuitry configured to provide at least one of:

short circuit protection, low voltage protection, over-voltage protection, over-current protection, and over-charge protection.

The output port 115a may be dimensioned for electrically coupling with a power or charging port of a mobile phone 190. The output port 115a may be disposed at a location on the charging case 110 complimentary to a location of a power or charging port of the mobile phone 190, thereby providing an electrical connection between the power supply 114 and the mobile phone 190 when the mobile phone 190 is secured within the charging case 110 and connected to the output port 115a. In an embodiment, the output port 115a comprises a conductive metal plug, dimensioned for inserting into a charging or power port of the mobile phone 190.

The input port 115b may be used to electrically couple the charging case 110 with an external power source. For example, connecting the input port 115b to an external power source can electrically couple the external power source to the power supply 114, for use in recharging the power supply 114. In an embodiment, the input port 115b may be dimensioned for receiving an end of a power supply cable corresponding to a power supply cable of the mobile phone 190. For example, the charging case 110 may be designed to hold an iPhone 11 Pro Max and the input port 115b may be dimensioned for receiving an end of a power supply cable for an iPhone 11 Pro Max.

In an embodiment, an external power supply may concurrently engage with both the output port 115a and the input port 115b, for use in simultaneously charging a mobile phone and re-charging the power supply 114. For example, an external power supply may be connected to the input port 115b, providing an external power source for re-charging the power supply 115, while simultaneously also charging a mobile phone connected to the output port 115a. Advantageously, the dual input/output port functionality allows for readily charging a mobile phone, and a power supply 114, without having to remove the mobile phone from the charging case 110.

In an embodiment, the charging case 110 may further include a power switch 116 for toggling an electrical connection between the power supply 114 and the port 115a and 115b. For example, actuating the switch 116 for a period of time may toggle an electrical connection between the ports 115a and 115b, and the power supply 114. For example, pressing and holding down the switch 116 may toggle between an on configuration and an off configuration, wherein the on configuration enables electrical connectivity between the power supply 114 and the port 115a and 115b; and, the off configuration disconnects the electrical connectivity between the power supply 114 and the ports 115a and 115b. In an embodiment, engaging the switch 116 for at least two seconds toggles between the off configuration and the on configuration. In an embodiment, the charging case 110 may comprise a plurality of LEDs 117 configured to provide a visual indication of a remaining capacity of the power supply 114. In an embodiment, tapping or momentarily actuating the switch 116 engages the plurality of LEDs 117 to temporarily connect with the power supply 114 and provide a visual indication of a remaining capacity of the power supply 114. In an embodiment, the LEDs 117 may exhibit a blinking behaviour when a remaining capacity of the power supply 114 is less than 5%.

In an embodiment, the locking mechanism 130 comprises a first locking element 140 disposed on the charging case 110, and, a second locking element 150 disposed on the mount 160. In an embodiment, the first and second locking elements 140 and 150 may be integrally formed into their respective hosts. For example, the first locking element 140 may be integrally formed with the charging case 110 and the second locking element 150 may be integrally formed with the mount 160. In an embodiment, the first and second locking elements 140 and 150 may be provided as separate components, for example, as part of a kit, and subsequently fixedly attached to their respective hosts. For example, the first locking element 140 may comprise a base 141 having a top side 142*a* and a bottom side 142*b* wherein the bottom side 142*b* may include an adhesive for fixedly attaching the bottom side 142*b* to an exterior of the charging case 110.

Collectively, the first and second locking elements 140 and 150 include a plurality of complimentary elements configured for selectively intermeshing and maintaining the first and second lock elements 140 and 150 in a locked configuration when intermeshed together. The complimentary elements may comprise a plurality of locking enclosures 144 and complimentary protruding arms 154 provided on separate locking elements, wherein the locking enclosures 144 are configured to receive and intermesh with the protruding arms 154, for selectively maintaining a secure lock between the first and second locking elements 140 and 150. In an embodiment, the protruding arms 154 are interconnected between, and extend from, a central element 153 disposed atop a base 151 of the second locking element.

In an embodiment, the locking enclosure 144 may comprise an opening 145, a recessed interior 146, and an abutment 148. The opening 145 may be disposed adjacent the recessed interior 146 and may be sized and dimensioned for allowing entry of a complimentary protruding arm 154 into the inner recess 146, of the locking enclosure 140; and, the abutment 148 may define an end of the locking enclosure 144, preventing the protruding arm 154 from extending past the end of the inner recess 146 when engaged therewith. The inner recess 146 may be dimensioned for providing a tight conforming fit with the protruding arm 154. In an embodiment, the inner recess 146 comprises a first geometry complimentary to a second geometry of the protruding arm 154, wherein the first and second geometry define interlockable features for intermeshing the inner recess 146 and the protruding arm 154 when the protruding arm 154 is inserted into a lock position within the inner recess 146, for securely maintaining a lock between the first and second locking elements 140 and 150. In an embodiment, manipulating the protruding arm 154 into the lock position with the inner recess 145 further comprises an audible indication. In an embodiment, the audible indication is a snap or click sound. In an embodiment, intermeshing between the inner recess 146 and the protruding arm 154 comprises a snap fit. In an embodiment, releasing a lock between the first locking element 140 and the second locking element 150 comprises exerting a substantial force in a rotational direction towards the opening 145, to un-mesh the protruding arm 154 and the inner recess 146 from a locking position. Embodiments of a protruding arm 154, opening 145, and inner recess 146 in accordance may be sized and dimensioned differently than the features presently illustrated in the figures. For example, the protruding arm 154 may be designed with thicker, thinner, longer, shorter, wider, and/or narrower prongs, along with corresponding sizing made to the opening 145 and inner recess 146, for selectively intermeshing and maintaining the first and second lock elements 140 and 150 in a locked configuration when intermeshed together.

The mount 160 may generally function as a clasping mount having a base 161 for disposing a locking element thereon—such as the second locking element 150—a first end 162, a second end 164, and a hinge 166. Embodiments of a mount in accordance with the present disclosure are not however limited to clasping mounts and include mounts which may releasably secure to other objects using non-clasping means.

Each of the first and second ends 162 and 164 may be pivotable about the hinge 166, allowing for relative movement between the ends 162 and 164. When the ends 162 and 164 are moved apart, the mount 160 defines an opening 161*a* for receiving an object to subsequently mount to. When the ends 162 and 164 are moved together, the mount 160 encloses and defines a shape based on a geometry of the mount 160 as defined between the ends 162 and 164. For example, when the ends 162 and 164 are fixed together, the mount 160 may define an annular cavity 161*b*, for use in mounting to an annular object, such as the handlebars of a bicycle or stroller.

In an embodiment the mount 160 comprises first and second semi-annular elements 163 and 165, formed integrally with first and second ends 162, and 164, respectively, and connected to the hinge 166. In an embodiment, the mount may further comprise first and second spacers 167 and 168, sized and dimensioned for improving a fit between the mount 160 and the object to be mounted to. In an embodiment, the mount 160 may comprise a resiliently deformable band 169 for conforming to a surface geometry of the object to be mounted to, improving a fit between the mount 160 and the object to be mounted to. In an embodiment, the mount 170 may include a fastening element 170 for selectively fastening the first and second end 162 and 164, together.

Embodiments of a mount in accordance with the present disclosure may include a mount shaped for conforming and attaching to the surface of different objects which may lack round features. Embodiments of a mount in accordance with the present disclosure include a mount configured for releasably securing to an object, feature, or surface which may lack a round or annular mounting surface, such as to mounting to a feature or surface in a vehicle, such as to the dashboard or other feature in a car, golf cart, or boat.

Figure 11:
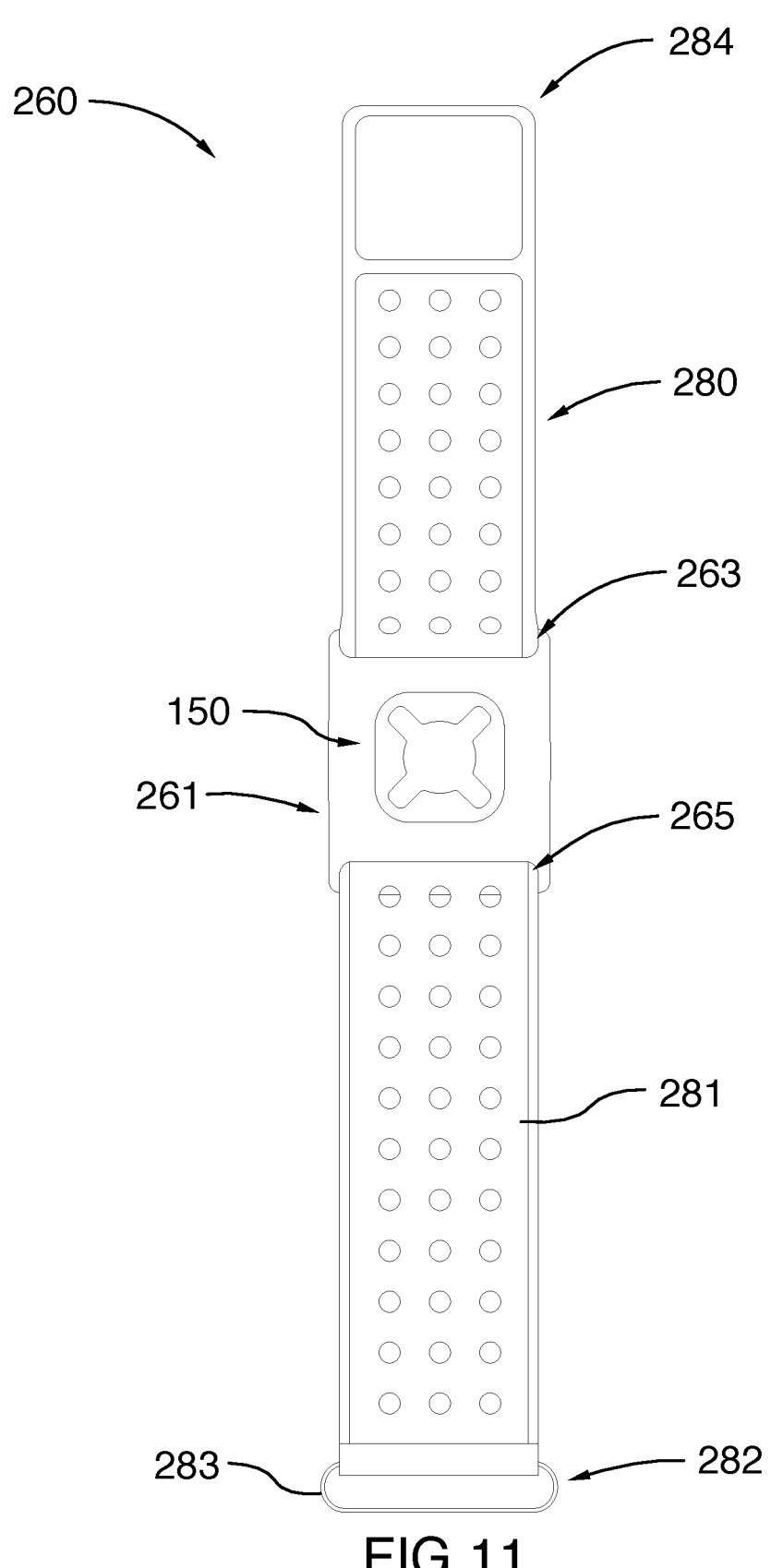
FIG. 11 is a top elevation view of a mount having an adjustable strap in accordance with an embodiment of the present disclosure.
Figure 12:
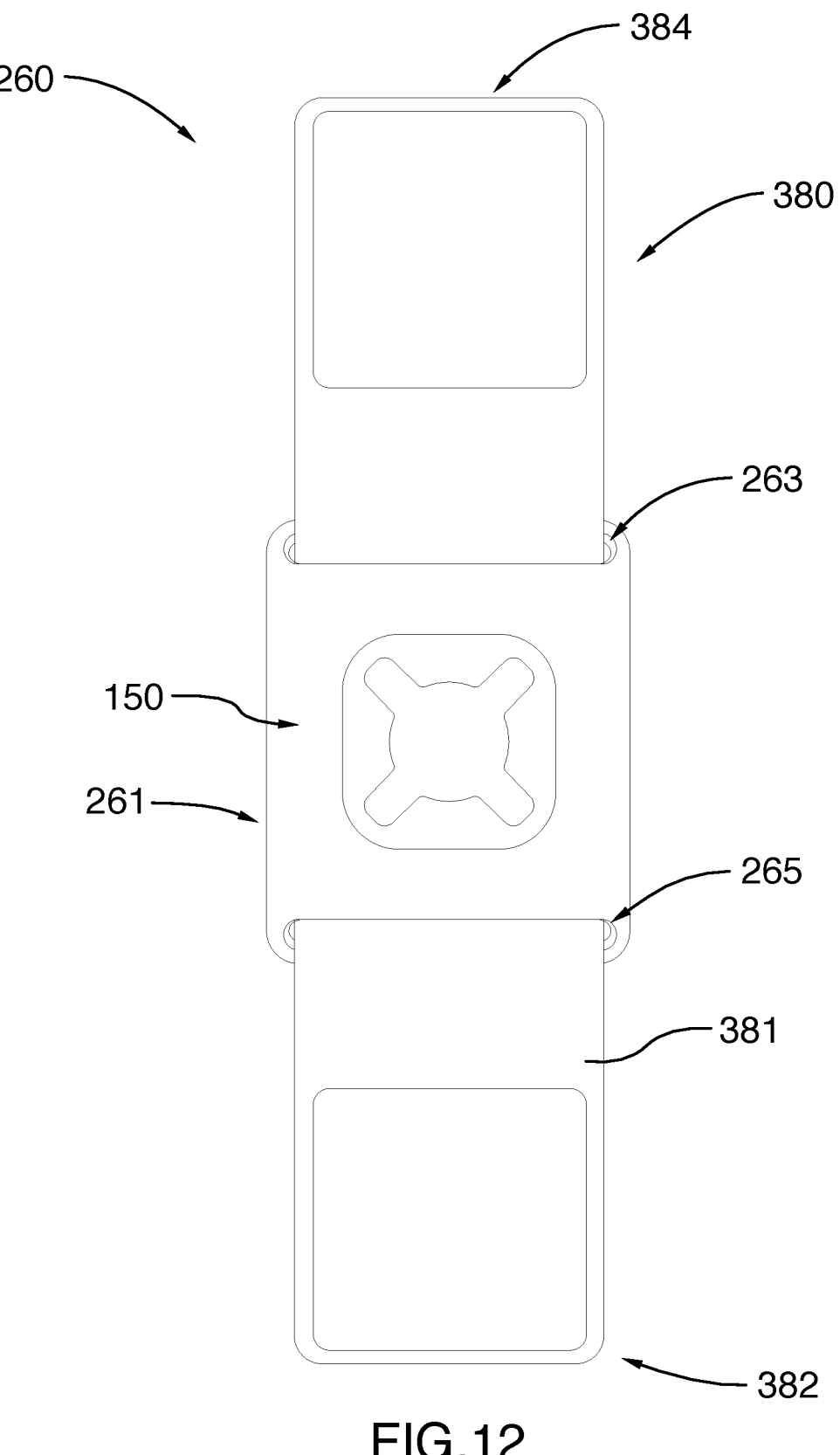
FIG. 12 is a top elevation view of a mount having an adjustable strap in accordance with an embodiment of the present disclosure.

FIGS. 11 and 12 illustrates a mount 260 in accordance with an embodiment of the present disclosure. The mount 260 may comprise a base 261 and a mounting mechanism such as the adjustable strap 280 (FIG. 11) or an adjustable strap 380 (FIG. 12), for use in coupling to a base 261 of the mount and attaching the mount 260 to an object. The base 261 may comprise a second locking element 150 disposed in the base 261, for use in securely locking the mount 260 to a charging case having a complimentary first locking element for locking with the second locking element 150. The base 260 may further comprise first and second openings 263 and 265 for threading an attachment mechanism, such as an adjustable strap, about the base 261.

In an embodiment, the adjustable strap 280 may comprise a first end 282 having a loop 283, and a second end 284. In operation, the adjustable strap 280 may feed through the openings 263 and 265 to couple the adjustable strap 280 to the mount 270. The second end 284 may feed through the loop 283 and attach to a desired location on the body 281 of the strap 280, for enclosing the strap 280 around an object, such as enclosing the strap 280 around an arm, a leg, a strap of a backpack, or other object that may be desirable to mount a charging case and mobile phone to.

Similarly, the adjustable strap 380 may feed through the openings 263 and 265 to couple the adjustable strap 380 to the base 261 of the mount 260. The first end 382 may comprise an adhering surface, such as Velcro, and the second end 384 may similarly comprise an adhering surface, for use in self-adhering the first and second ends 382 and 384 to a body 381 of the strap 380, thereby enclosing the strap 380 around an object, such as enclosing the strap 380 around an arm, a leg, a strap of a backpack, or other object that may be desirable to mount a charging case and mobile phone to.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A charging device for a mobile phone, comprising:
a case having a recessed interior for use in holding the mobile phone there-within, the recessed interior being dimensioned for conforming contact with an exterior of the mobile phone, the case further comprising:
a power supply embedded within the case, and
a power port electrically coupled to the power supply, the power port for use in connecting to a mobile phone charging port;
a mounting element having a clasp configured for releasably mounting to an annular object, the clasp having a first end and a second end releasably connectable to the first end and defining an annular cavity when connected therewith for mounting to the annular object, the clasp further including a hinge connected between the first end and the second end, the first and second ends being pivotable about the hinge, and
a locking mechanism for releasably attaching the case to the mounting element, the locking mechanism having a first locking element disposed on an exterior surface of the case, and a second locking element disposed on the mounting element configured for releasably locking with the first locking element,
wherein the first locking element and the second locking element collectively comprise complimentary mating elements configured to lock the first and second locking elements together when intermeshed in a locked position and unlock the first and second locking elements from one-another when unmeshed in an unlocked position.

2. The charging device of claim 1, wherein the first locking element is integrally formed with the exterior surface of the case.

3. The charging device of claim 1, wherein the mating elements are rotatably meshable, and a relative rotation of the first and second locking elements transitions the locked and unlocked positions.

4. The charging device of claim 1, wherein the mating elements comprise:
a plurality of protrusions, and
a plurality of complimentary locking enclosures, each locking enclosure having an opening on an exterior surface for receiving a protrusion and an inner recess formed adjacent the opening, the inner recess dimensioned for intermeshing with the protrusion.

5. The charging device of claim 4, wherein engaging the locked position comprises inserting the plurality of protrusions through the plurality of openings of the locking enclosures, and rotating the plurality of protrusions into the plurality of locking enclosures, for intermeshing with the recess thereof.

6. The charging device of claim 4, wherein a width of the protrusion substantially corresponds to a width of the recess.

7. The charging device of claim 4, wherein the first locking element comprises the plurality of locking enclosures, and the second locking element comprises the plurality of protrusions.

8. The charging device of claim 4, wherein the plurality of locking enclosures comprise four locking enclosures and the plurality of protrusions comprise four complimentary protrusions.

9. The charging device of claim 1, wherein:
the first end comprises a first semi-annular element, and
the second end comprises a second semi-annular element;
wherein the first semi-annular element and the second semi-annular element define the annular cavity when the first end is connected with the second end.

10. The charging device of claim 9, further comprising:
a resiliently compressible material disposed between the first and second end of the clasp, for conforming a fit of the clasp to an exterior of the annular object when connected thereto.

11. The charging device of claim 1, wherein the charging device is for mounting to a handle bar.

12. The charging device of claim 1, wherein the mounting element comprises an adjustable strap for wrapping around and attaching to an object.

13. The charging device of claim 1, wherein the power supply comprises a rechargeable power source.

14. The charging device of claim 13, wherein the charging device further comprises a solar cell electrically coupled to the power supply.

15. The charging device of claim 1, wherein the charging device further comprises a switch for toggling electrical connectivity between the power supply and the power port.

16. The charging device of claim 13, wherein the power port comprises an input port and an output port, wherein the output port is for use in connecting to the mobile phone charging port, and, the input port is for use in connecting to an external power source, for use in recharging the power supply.

17. A kit for assembling a charging device and bicycle mount for a mobile phone, comprising:

a case having a recessed interior for use in holding the mobile phone there-within, the recessed interior being dimensioned for contacting conformity with an exterior of the mobile phone, the case further comprising:

a power supply embedded within the case, and a power port electrically coupled to the power supply, the power port for use in connecting to a mobile phone charging port;

a first locking element attachable to an exterior surface of the case, and a mounting element comprising:

a second locking element releasably locking with the first locking element, the first locking element and the second locking element collectively comprising complimentary mating elements configured to lock the first and second locking elements together when intermeshed in a locked position and unlock the first and second locking elements from one-another when unmeshed in an unlocked position, and a releasably attachable clasp having first and second ends and a hinge connected therebetween, the first and second ends being pivotable about the hinge and movable between an unmounted mode and a mounted mode, the first and second ends defining:

an opening for receiving an annular object when separated apart in the unmounted mode, and an annular cavity for encircling the annular object when connected together in the mounted mode.

18. A charging device for a mobile phone, comprising:

a case having a recessed interior for use in holding the mobile phone there-within, the recessed interior being dimensioned for conforming contact with an exterior of the mobile phone, the case further comprising:

a power supply embedded within the case, and a power port electrically coupled to the power supply, the power port for use in connecting to a mobile phone charging port;

a mounting element configured for releasably mounting to an object, and a locking mechanism for releasably attaching the case to the mounting element, the locking mechanism having a first locking element disposed on an exterior surface of the case, and a second locking element disposed on the mounting element configured for releasably locking with the first locking element, wherein the first locking element and the second locking element collectively comprise complimentary mating elements configured to lock the first and second locking elements together when intermeshed in a locked position and unlock the first and second locking elements from one-another when unmeshed in an unlocked position, the mating elements comprising four protrusions and four complimentary locking enclosures, each locking enclosure having an opening on an exterior surface for receiving a protrusion and an inner recess formed adjacent the opening, the inner recess dimensioned for intermeshing with the protrusion.

19. The charging device of claim 13, wherein the rechargeable power source is configured for recharging via induction.

20. The charging device of claim 16, wherein the input port and the output port are configured to provide for:

recharging the power supply when the input port is connected to the external power source, concurrently with, charging the mobile phone when the mobile phone is connected to the output port.

* * * * *